United States Patent
Jain et al.

(10) Patent No.: US 12,530,386 B2
(45) Date of Patent: Jan. 20, 2026

(54) SYSTEMS AND METHOD FOR SIMULTANEOUS RELEVANCE AND VARIETY CONTROL IN AUDIENCE TARGETING

(71) Applicant: PREDICTIVE POP, INC., New York, NY (US)

(72) Inventors: Ajit Jain, New York, NY (US); Matt Griffiths, London (GB); Maxwell Spiegelman, New York, NY (US); Kevin Peng, New York, NY (US); Drew Stein, New York, NY (US)

(73) Assignee: PREDICTIVE POP, INC., New York, NY (US)

( * ) Notice: Subject to any disclaimer, the term of this patent is extended or adjusted under 35 U.S.C. 154(b) by 0 days.

(21) Appl. No.: 18/406,156

(22) Filed: Jan. 7, 2024

(65) Prior Publication Data

US 2025/0225166 A1 Jul. 10, 2025

(51) Int. Cl.
*G06F 16/338* (2019.01)
*G06F 16/3329* (2025.01)
(Continued)

(52) U.S. Cl.
CPC ........ *G06F 16/338* (2019.01); *G06F 16/3329* (2019.01); *G06F 16/3338* (2019.01); *G06F 16/335* (2019.01); *G06F 16/35* (2019.01)

(58) Field of Classification Search
CPC .............. G06F 16/338; G06F 16/3329; G06F 16/3338; G06F 16/335; G06F 16/35
See application file for complete search history.

(56) References Cited

U.S. PATENT DOCUMENTS 6,963,867 B2  11/2005  Ford et al.
7,617,176 B2  11/2009  Zeng et al.
(Continued)

OTHER PUBLICATIONS

Wikipedia, Cosine Similarity, retrieved on Mar. 22, 2025, indexed Sep. 23, 2022, retrieved from the internet <URL: https://web.archive.org/web/20220923120621/https://en.wikipedia.org/wiki/Cosine_similarity (Year: 2022).*

(Continued)

*Primary Examiner* — Tyler J Torgrimson
(74) *Attorney, Agent, or Firm* — Knobbe, Martens, Olson & Bear, LLP

(57) ABSTRACT

Disclosed herein is a system and method for controlling relevance and variety in stored data in data management platforms for audience targeting. The method comprises receiving an input query using a user interface from a user; storing and indexing the target audience in a database; providing an expanded set of search queries from the input query based on the input query, by using a language model; receiving the expanded set of search queries to provide a result of matched target audiences based on the expanded set of search queries matched with the target audiences stored in the database; receiving matched target audiences from a relevance module to provide a filtered result of the matched target audiences by discarding non-relevant target audience based on preset calculation; and performing multiscale clustering to provide a graphical representation or a ranked list of the filtered matched target audiences based on a weightage score.

16 Claims, 4 Drawing Sheets

(51) Int. Cl.
*G06F 16/3332* (2025.01)
*G06F 16/335* (2019.01)
*G06F 16/35* (2019.01)

(56) References Cited

U.S. PATENT DOCUMENTS

| | | | |
|---|---|---|---|
| 2008/0120292 | A1 | 5/2008 | Sundaresan et al. |
| 2010/0325105 | A1 | 12/2010 | Guo et al. |
| 2011/0184932 | A1 | 7/2011 | Hennum et al. |
| 2011/0307425 | A1 | 12/2011 | Wang et al. |
| 2016/0048556 | A1* | 2/2016 | Kelly ............... G06Q 10/10 707/767 |
| 2017/0132313 | A1* | 5/2017 | Kukla ............... G06F 16/334 |
| 2022/0188079 | A1* | 6/2022 | Kohisseri ............... G06N 5/04 |

OTHER PUBLICATIONS

Ajit Jain, How to Support Situated Design Education Through AI-Based Analytics, May 2021, provided by applicant via IDS (Year: 2021).*

Jain, Ajit et al. 2021. Recognizing creative visual design: multiscale design characteristics in free-form web curation documents. In Proceedings of the 21st ACM Symposium on Document Engineering (DocEng '21). Association for Computing Machinery, New York, NY, USA, Article 18, 1-10. https://doi.org/10.1145/3469096.3469869.

Jain, A. (2021). How to Support Situated Design Education through AI-Based Analytics (Doctoral dissertation).

Ajit Jain, Nic Lupfer, Yin Qu, Rhema Linder, Andruid Kerne, and Steven M. Smith. 2015. Evaluating TweetBubble with Ideation Metrics of Exploratory Browsing. In Proceedings of the 2015 ACM SIGCHI Conference on Creativity and Cognition (C&C '15). Association for Computing Machinery, New York, NY, USA, 53-62. https://doi.org/10.1145/2757226.2757239.

Andrew M. Webb and Andruid Kerne. 2011. Integrating implicit structure visualization with authoring promotes ideation. In Proceedings of the 11th annual international ACM/IEEE joint conference on Digital libraries (JCDL '11). Association for Computing Machinery, New York, NY, USA, 203-212. https://doi.org/10.1145/1998076.1998116.

* cited by examiner

SYSTEMS AND METHOD FOR SIMULTANEOUS RELEVANCE AND VARIETY CONTROL IN AUDIENCE TARGETING

FIELD OF THE INVENTION

The present invention generally relates to a data management system and in particular relates to a computer implemented method and system that facilitates relevance and variety control in audience targeting using a data management system.

BACKGROUND OF THE INVENTION

The existing systems that enable users to search for target audiences do not prioritize the diversity of results. As a consequence, the top results, while relevant, tend to appear quite similar to one another.

For instance, when searching for audience segments interested in a new credit card, the top results may predominantly revolve around credit card products (e.g., 'premium credit card user' or 'corporate credit card user') or user behavior (e.g., 'active credit card user' or 'major credit card user'). Other segments, such as those related to balance transfer (e.g., 'high total credit card balance' or 'balance transfer cards') or credit history (e.g., 'credit card high limit' or 'high credit card score'), may be relegated to lower rankings and scattered throughout the search results. This poses a challenge for users aiming to maximize their outreach by identifying a diverse range of target audiences for their campaigns. The present invention introduces an approach that seeks to strike a balance between relevance and variety within search results.

From a technical standpoint, existing systems employ one or more natural language processing methods for query/document expansion, which is done to account for relevant terms that users might not have included in their search queries. However, the results are typically ranked using metrics like TF-IDF, PageRank, and Usability, which do not explicitly consider the variety metric-a concept that creativity theory defines as the breadth of the solution space. Consequently, the top results, although relevant, often appear quite similar to one another. This becomes particularly challenging in audience targeting systems, where the user's primary objective is often to reach a diverse array of relevant segments through their campaign.

Nonetheless, there is a need to develop a system and method for data management that uses semantic distances and multiscale clustering to address variety in search results.

OBJECT OF THE INVENTION

An object of the present invention is to provide a system and method for controlling the relevance and variety of stored data in data management platforms for audience targeting.

Another object of the present invention is to provide the system for simultaneously controlling relevance and variety of search results that facilitate the result efficiently in terms of less time, computational load, precise results, and cost-effective.

Another object of the present invention is to provide the system in view of the semantic distances representing the extent of the conceptual space covered, and hence, can be used to control the variety of results.

SUMMARY OF THE INVENTION

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

Described herein is a system and method for controlling the relevance and variety of stored data in data management platforms for audience targeting.

One embodiment of the present invention discloses that the system comprises an input means configured to receive an input query from a user and a database configured to store and index the target audience.

Further, the system comprises a memory to store a plurality of instructions and a processor configured to receive the input query and execute the plurality of instructions stored in the memory. The memory comprises an expansion module configured to provide an expanded set of search queries from the input query by using a language model and a search module configured to provide a result of matched target audiences based on the expanded set of search queries matched with the target audiences stored in the database.

Furthermore, the memory also comprises a relevance module configured to provide a filtered result of the matched target audiences by discarding non-relevant target audience from the received matched target audience based on preset calculations and a variety module configured to perform multiscale clustering to provide a graphical representation of the filtered matched target audiences based on a weightage score. The system also comprises a display unit configured to show the graphical representation of the previous step as a ranked list of associated documents.

Another embodiment of the present invention discloses that the system provides the ranked list of associated documents is presented in response to the selection of the relevance and variety control in audience targeting.

In a preferred embodiment of the present invention, the computer implemented system discloses that the preset calculation calculates semantic distances among obtained the matched target audiences.

Yet another embodiment of the present invention discloses the computer implemented system, which further comprises vector representations of the matched target audiences using a pre-trained universal sentence encoder model.

A preferred embodiment of the invention discloses that the computer implemented system, wherein the semantic distances of the matched target audiences are obtained by calculating cosine similarity among the vector representations, wherein standard representation of cosine similarity is calculated from, $$\cos(\theta) = \frac{A \cdot B}{\|A\|\|B\|} = \frac{\sum_{i=1}^{n} A_i B_i}{\sqrt{\sum_{i=1}^{n} A_i^2 \cdot \sum_{i=1}^{n} B_i^2}}$$

In a preferred embodiment of the present invention, the computer implemented system, wherein a cosine score is multiplied by gamma, fine-tuned using one or more training sets and having a default value of 0.5, if after discarding common words, two target audiences are found to be antonyms.

One embodiment of the present invention discloses that the computer implemented system, wherein the relevance module discards any cosine similarity scores less than a default value of 0.6 to discard any non-relevant target audiences that have no associations remaining.

In a preferred embodiment of the present invention discloses, the computer implemented system, wherein each node of the graph represents the matched target audiences.

In a preferred embodiment of the present invention, the computer implemented system, wherein each edge of the graph is assigned a weight equal to one minus the cosine score and a network visualization library configured to construct the graph using the edge lengths and obtain coordinates (x, y) for all nodes.

In one embodiment of the present invention, the computer implemented system, wherein the variety module selects a level represented by half the total number of levels in a cluster hierarchy and collapses all sub-clusters at that level.

In one embodiment of the present invention, the computer implemented system, wherein the variety module arranges the resulting clusters in a layout for presentation, preferably, assigns each cluster a label based on common words found within the cluster items, or obtains the label through a large language model, or use a combination of thereof.

In one embodiment of the present invention, the computer implemented system, wherein the multiscale clustering is performed through Delaunay triangulation for node coordinates and distances among the matched target audiences, In one embodiment of the present invention, the computer implemented system, wherein the multiscale clustering iteratively discards edges having length greater than the sum of global mean and a tolerance value derived using the global mean, global standard deviation, and local mean for each node represented by, $$ThresholdLength = GlobalMean + ToleranceValue$$

wherein ToleranceValue=alpha*GlobalMean*GlobalStDev/LocalMean, and alpha is set to a value fine-tuned using a training set, the default value is 1.

In one embodiment of the present invention, the computer implemented system, wherein the language model is selected, e.g., from word2vec, GloVe, or GPT-4 to expand the input query to obtain a set of search queries.

In one embodiment of the present invention, the computer implemented system, wherein the search module selects M matched target audiences from the results obtained, and the default value of M is 100.

One embodiment of the present invention discloses that the computer implemented system, further comprises a balance phase to rank the results using additional scores, e.g., selected from TF-IDF, PageRank, Usability, or a combination thereof.

In one embodiment of the present invention discloses a method for controlling relevance and variety in stored data in data management platforms for audience targeting.

The present invention discloses that the method employs a processor executing computer executable instructions stored on a computer-readable storage medium to implement the following relevance and variety control processing acts: receives an input query using a user interface from user.

Further, the present invention discloses a database for storing and indexing the target audience.

The method of the present invention provides an expanded set of search queries from the input query based on the input query, by using a language model. Further receives the expanded set of search queries to provide a result of matched target audiences based on the expanded set of search queries matched with the target audiences stored in the database.

Furthermore, the present invention receives matched target audiences from a relevance module to provide a filtered result of the matched target audiences by discarding non-relevant target audiences based on preset calculation. The method further performs multiscale clustering to provide a graphical representation of the filtered matched target audiences based on a weightage score. The system also comprises a display unit configured to show the graphical representation of the previous step as a ranked list of associated documents.

In one embodiment of the present invention, the method wherein the preset calculation calculates semantic distances among obtained matched target audiences.

A preferred embodiment of the present invention discloses the method wherein the method uses the semantic distances and multiscale clustering to simultaneously control the relevance and variety of results.

The present invention applies to audience search systems that allow users to search for target segments, including use or integration within:

Ad Tech Curated Deals/Private Marketplaces (PMPs) Platforms

Ad Tech Data Management Platforms (DMPs)

Ad Tech Supply Side Platforms (SSPs)

Ad Tech Demand Side Platforms (DSPs)

More broadly, the present invention applies to any search system where there is a need for simultaneously controlling relevance and variety of search results.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

Non-limiting examples of the present disclosure will be described in the following, with reference to the appended drawings, in which.

DETAILED DESCRIPTION OF THE DRAWINGS

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention. The preferred systems and methods are now described.

The present invention discloses the system and method for controlling the relevance and variety of stored data in data management platforms for audience targeting. The system of the present disclosure uses a seed-grow-balance approach to simultaneously control relevance and variety in audience targeting.

Figure 1:
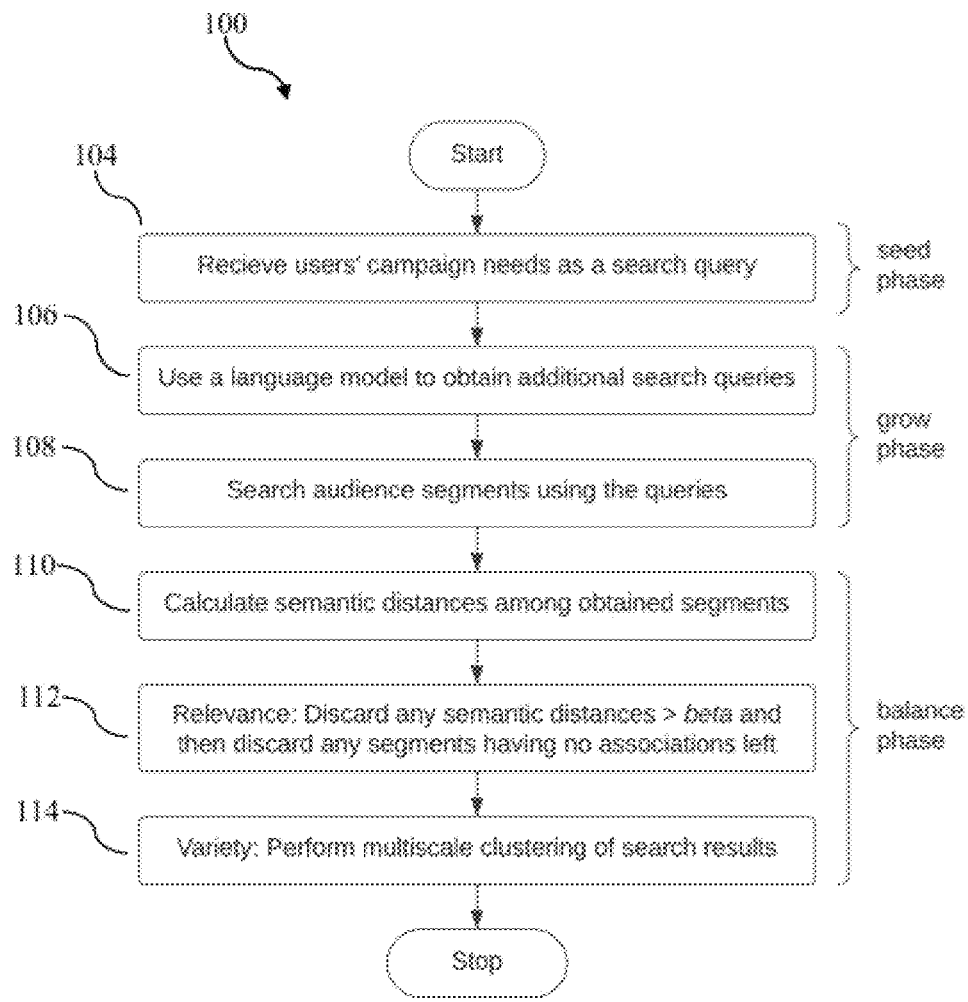
FIG. 1 illustrates a flow diagram of controlling relevance and variety in stored data in data management platforms for audience targeting, according to an embodiment of the present invention.

FIG. 1 depicts a flow diagram of controlling relevance and variety in stored data in data management platforms for audience targeting. As shown, in the 'seed' phase, a search input allows the user to express their campaign needs in natural language (104). Then in the 'grow' phase, a language model is used to retrieve an expanded set of queries, which queries are then used to search against one or more audience segment stores (106, 108). Further, in the 'balance' phase, semantic distances are calculated among obtained segments, relevance is ascertained of certain segments and those are discarded having no association left, and by using multiscale clustering, variety of the search results is obtained (110, 112, 114).

The step-wise explanation of the flow diagram of FIG. 1 is as follows:

Step 1) Form vector representation of matched segments of search query using a pre-trained universal sentence encoder model, as being referred to in steps 104, 106 and 108.

Step 2) Obtain semantic distances among matched segments, in Step 110, by calculating cosine similarity among the vector representations. The standard representation of cosine similarity is:

$$\cos(\theta) = \frac{A \cdot B}{\|A\|\|B\|} = \frac{\sum_{i=1}^{n} A_i B_i}{\sqrt{\sum_{i=1}^{n} A_i^2 \cdot \sum_{i=1}^{n} B_i^2}}$$

where the semantic distances represent the extent of the conceptual space covered, and hence, can be used to control the variety of results. In a preferred embodiment of the present invention, the computer implemented system, wherein a cosine score is multiplied by gamma, fine-tuned using one or more training sets and having a default value of 0.5, if after discarding common words, two target audiences are found to be antonyms.

Step 3) To control relevance, in Step 112, discard any cosine similarity scores less than beta (default value 0.6), as these represent semantic associations that are very far. The value of beta can be fine-tuned using a training set. Also, discard any segments which have no associations remaining.

Step 4) Form a graph where each node represents a matched segment and each edge is assigned a weight equal to one minus the cosine similarity scores from Step 3. Use the edge lengths to construct a graph using a network visualization library and obtain coordinates (x, y) for all nodes.

Step 5) Using the node coordinates and distances among them, perform multiscale clustering through Delaunay triangulation (an O(n log n) approach), which iteratively discards edges having length greater than the sum of global mean and a tolerance value derived using the global mean, global standard deviation, and local mean for each node:

ThresholdLength=GlobalMean+ToleranceValue where ToleranceValue=alpha*GlobalMean*GlobalStDev/LocalMean and alpha=1 by default (fine-tuned using training set)

Step 6) To control variety, in Step 114, select the level represented by half the total number of levels in the cluster hierarchy and collapse all sub-clusters at that level. Based on application needs, present the resulting clusters in the desired layout, and optionally assign each cluster a label based on common words occurring across cluster items or by obtaining the label through a large language model, or a combination thereof.

Figure 2:
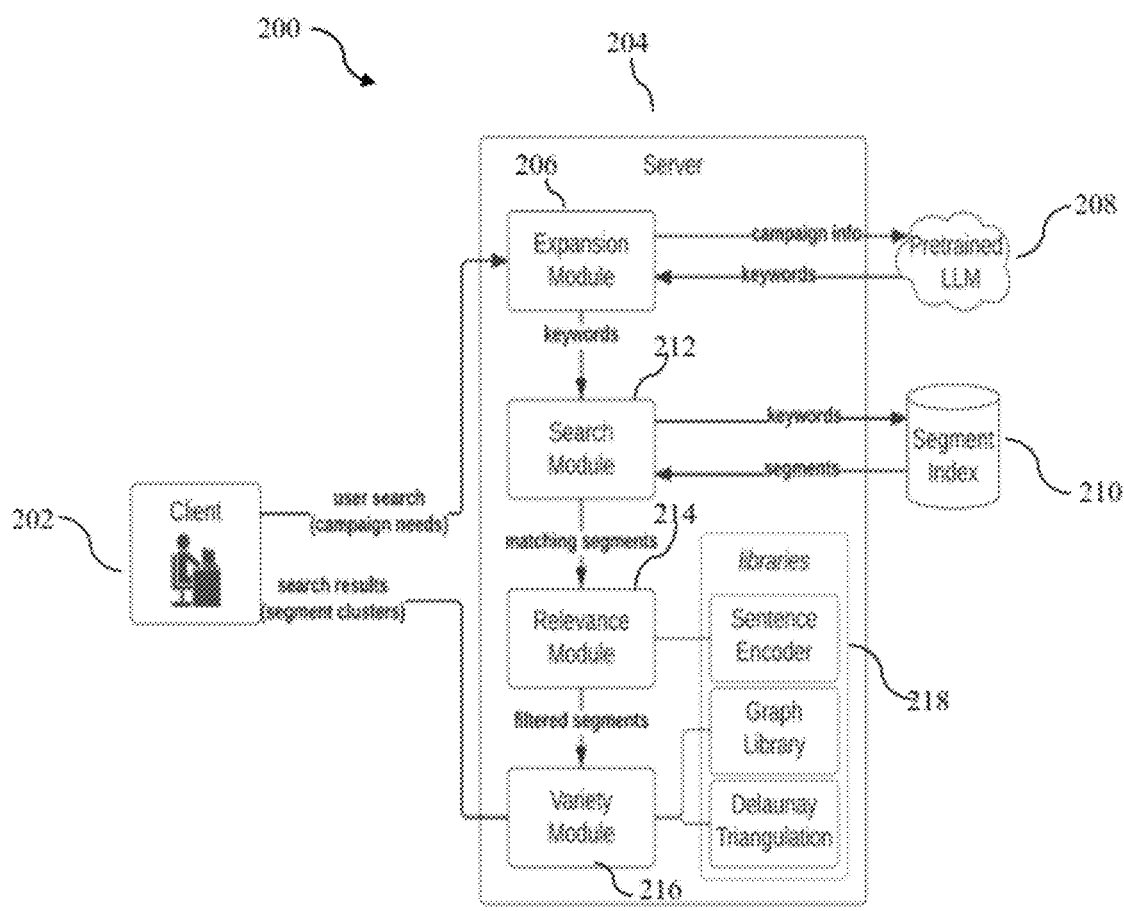
FIG. 2 illustrates a block diagram of a computer implemented system for controlling relevance and variety of stored data in data management platforms for audience targeting, according to an embodiment of the present invention.

FIG. 2 illustrates a block diagram of the system. 200 in accordance with the present disclosure, comprising three phases—seed-grow-balance—each of which is described below:

The seed phase is responsible for collecting input from a user 202. A common implementation is to use HTML to provide an input box on a webpage.

In the Grow phase, the search terms from the seed phase are expanded. The system 200 comprises an expansion module 206 that is configured to provide the expanded set of search queries from the input query by using a language model 208. The system 200 further comprises a search module 212 configured to provide a result of matched target audiences based on the expanded set of search queries matched with the target audiences stored in the database 210. In one of the preliminary implementations, the system 200 utilizes word2vec word embeddings. In another experimental implementation, the system 200 uses a large language model 208 to obtain the expanded set of search queries in the grow phase being more complex than the seed phase. The process may be defined as follows:

Step 1) Use a language model 208 (e.g., word2vec, GloVe, GPT-4) to expand the input query that the user entered in the 'seed' phase and obtain the expanded set of search queries.

Step 2) Use the expanded set of search queries to match target audiences stored in a database. Select the top N (default: 100) target audiences from the results obtained for each search query.

Further, for the balance phase, the system comprises a relevance module 214 configured to provide a filtered result of the matched target audiences by discarding non-relevant target audience from the received matched target audience based on preset calculations.

Further, a variety module 216 is configured to perform multiscale clustering to provide a graphical representation of the filtered matched target audiences based on a weightage score. A display unit may be configured to show the graphical representation of the previous step as a ranked list of associated documents.

In conventional search systems, the first two phases result in a set of search queries that are used to match against documents stored in a database. The results are typically ranked using scores such as TF-IDF, PageRank, and Usability, which do not focus on the variety metric—a measure that creativity theory defines as the span of the solution space. Hence, the top results, albeit relevant, may all look similar to each other.

The present system on the other hand uses semantic distances and multiscale clustering to simultaneously control the relevance and variety of results.

Figures 3, 4:
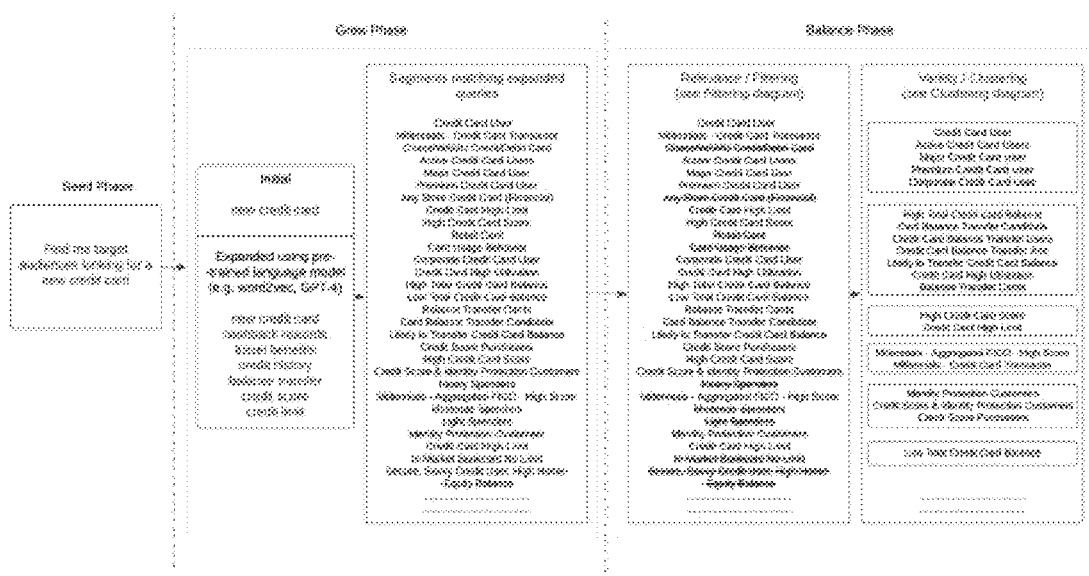
FIG. 3 illustrates an end-to-end example produced by controlling the relevance and variety of search results, according to an embodiment of the present invention.
FIG. 4 illustrates a detailed filtering part of the example produced by controlling the relevance and variety of search results, according to an embodiment of the present invention.

FIG. 3 depicts an end-to-end example produced by controlling the relevance and variety of search results according to the present invention. In this example, a user provides an input query such as pertaining to a new credit card in the seed phase. The input query is passed to the grow phase where it is expanded. The processed output from the grow phase is transferred to the balance phase, which includes a relevance module and a variety module. These modules work together to deliver search results based on relevance and variety.

In the seed phase, for example, a query is received to find target audiences looking for a new credit card. In the grow phase, the query is expanded from initial "new credit card" to "new credit card", "cashback rewards", "travel benefits", "credit history" and the like using pre-trained language model. Following expansion in the grow phase, segments are matched for expanded queries such as credit card user, Millenials—credit card transactor, chase/WAMU credit/debit card, active/major/premim credit card users and so on. Then in the balance phase, filtering is done to find only relevant results by discarding results greater than a pre-defined criteria, such as discarding results pertaining to chase/WAMU credit/debit card, any store credit card and the like. Subsequently, variety of results is achieved using multiscale clustering, for example, based on user type, balance history, credit score and the like.

FIG. 4 shows the filtering part of the example of FIG. 3 produced by controlling the relevance and variety of search results. In the filtering component of the claimed invention, the preset calculation is employed to calculate semantic distances among the obtained matched target audiences. This process aims to provide precise results, ultimately reducing the processor's computational load.

Figure 5:
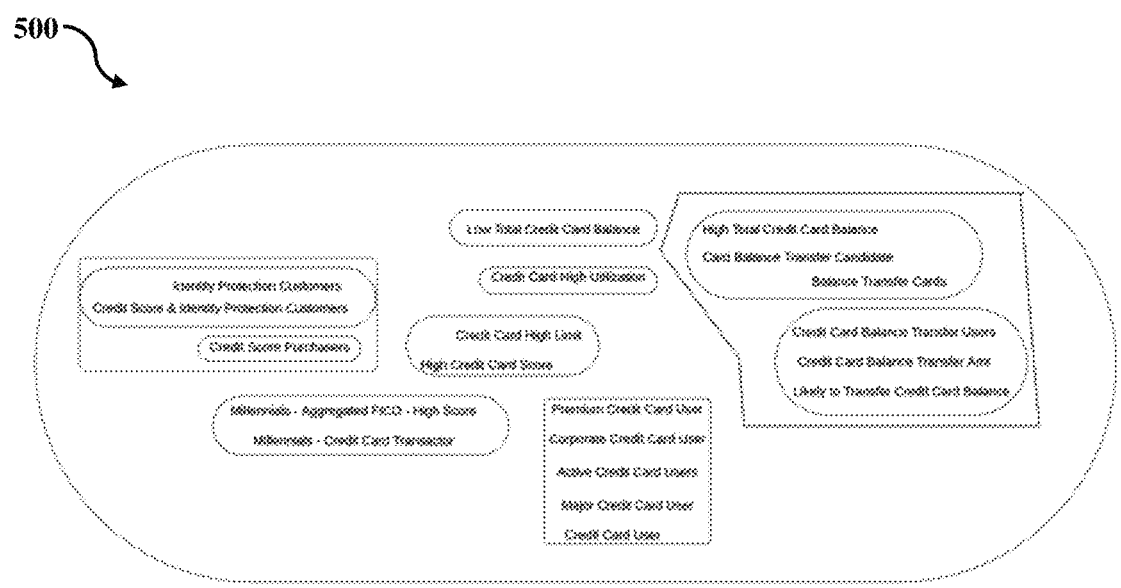
FIG. 5 illustrates a detailed clustering part of the example produced by controlling the relevance and variety of search results, according to an embodiment of the present invention.

Referring to FIG. 5, a preferred embodiment of the present invention discloses a detailed clustering part of the example produced by controlling the relevance and variety of search results.

In an embodiment, referring to the example discussed above, the clustering is done for identity protection customers, credit score and identity protection customers, and credit score purchasers among the search results. In the same way, clustering can be done in terms of credit card balance and utilization related parameters.

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and the illustrative examples shown and described. Thus, this application is intended to embrace alterations, modifications, and variations that fall within the scope of the appended claims.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

Moreover, although the present invention and its advantages have been described in detail, it should be understood that various changes, substitutions, and alterations can be made herein without departing from the invention as defined by the appended claims. Moreover, the scope of the present application is not intended to be limited to the particular embodiments of the process, machine, manufacture, and composition of matter, means, methods, and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The preceding description has been presented with reference to various embodiments. Persons skilled in the art and technology to which this application pertains will appreciate that alterations and changes in the described structures and methods of operation can be practiced without meaningfully departing from the principle, spirit, and scope.

What is claimed is:

1. A computer implemented system for controlling relevance and variety of stored data in data management platforms for audience targeting, the system comprising:
    an input means (202) configured to receive an input query from a user;
    a database (210) configured to store and index a target audience;
    a memory to store a plurality of instructions;
    a processor configured to receive the input query and execute the plurality of instructions stored in the memory comprising:
    an expansion module (206) configured to provide an expanded set of search queries from the input query based on the input query by using a language model (208),
    a search module (212) configured to provide a result of matched target audiences based on the expanded set of search queries matched with the target audiences stored in the database (210);
    a relevance module (214) configured to provide a filtered result of the matched target audiences by discarding non-relevant target audiences from the received matched target audience based on a preset calculations, wherein the preset calculations include generating vector representations of the matched target audiences using a pre-trained universal sentence encoder model;
    a variety module (216) configured to perform multiscale clustering to provide a graphical representation of the filtered matched target audiences based on a weightage score,
    wherein each edge in the graphical representation is assigned a weight equal to one minus a cosine similarity score between the corresponding matched target audiences, and a network visualization library is configured to compute coordinates (x, y) for each node based on the edge lengths; and
    a display unit configured to show the graphical representation of the previous step as a ranked list of associated documents.

2. The computer implemented system of claim 1, wherein the ranked list of associated documents is presented in response to selection of the relevance and variety control in the target audience.

3. The computer implemented system of claim 1, wherein the preset calculations calculates semantic distances among the obtained matched target audiences.

4. The computer implemented system of claim 1, wherein the preset calculations calculates the semantic distances of the matched target audiences by calculating a cosine similarity among the vector representations, wherein standard representation of the cosine similarity is calculated from, $$\cos(\theta) = \frac{A \cdot B}{\|A\|\|B\|} = \frac{\sum_{i=1}^{n} A_i B_i}{\sqrt{\sum_{i=1}^{n} A_i^2 \cdot \sum_{i=1}^{n} B_i^2}}.$$

5. The computer implemented system of claim 1, wherein the relevance module (214) is configured to compute cosine similarity scores and discards any cosine similarity scores less than a default value of 0.6 to discard any non-relevant target audience which have no associations remaining.

6. The computer implemented system of claim 1, wherein each node in the graphical representation corresponds to the matched target audiences.

7. The computer implemented system of claim 1, wherein the variety module (216) selects a level represented by half the total number of levels in a cluster hierarchy and collapses all sub-clusters at that level.

8. The computer implemented system of claim 1, wherein the variety module (216) arranges a resulting clusters in a layout for presentation, preferably, assigns each cluster a label based on words with high TF-IDF scores found within the cluster items, or obtain the label through a large language model, or use a combination of thereof.

9. The computer implemented system of claim 1, wherein the multiscale clustering is performed through Delaunay triangulation for node coordinates and distances among the matched target audiences.

10. The computer implemented system of claim 9, wherein the multiscale clustering iteratively discards edges having length greater than the sum of global mean and a tolerance value derived using the global mean, global standard deviation, and local mean for each node represented by, ThresholdLength=GlobalMean+ToleranceValue wherein ToleranceValue=alpha*GlobalMean*GlobalStDev/LocalMean, and alpha is set to a value fine-tuned using a training set, a default value is 1.

11. The computer implemented system of claim 1, wherein the language model is selected from word2vec, GloVe, or GPT-4 to expand the input query to obtain a set of search queries.

12. The computer implemented system of claim 1, wherein the search module (212) selects M matched target audiences from the results obtained, and a default value of M is 100.

13. The computer implemented system of claim 1, further comprises a balance phase to rank results using additional scores selected from TF-IDF, PageRank, Usability or a combination thereof.

14. A method for controlling relevance and variety in stored data in data management platforms for audience targeting, the method comprises:
    employing a processor executing computer executable instructions stored on a computer readable storage medium to implement the following relevance and variety control processing acts:
    receiving an input query using a user interface from user;
    storing and indexing a target audience in a database (210);
    providing an expanded set of search queries from the input query based on the input query, by using a language model (208);
    receiving the expanded set of search queries to provide a result of matched target audiences based on the expanded set of search queries matched with the target audiences stored in the database;

receiving matched target audiences from a relevance module (214) to provide a filtered result of the matched target audiences by discarding non-relevant target audience based on a preset calculation, wherein the preset calculations include generating vector representations of the matched target audiences using a pre-trained universal sentence encoder model;

performing multiscale clustering to provide a graphical representation of the filtered matched target audiences based on a weightage score;

wherein each edge in the graphical representation is assigned a weight equal to one minus a cosine similarity score between the corresponding matched target audiences, and a network visualization library is configured to compute coordinates (x, y) for each node based on the edge lengths; and showing the graphical representation of the previous step as a ranked list of associated documents.

15. The method of claim 14, wherein the preset calculation calculates semantic distances among obtained the matched target audiences.

16. The method as claimed in claim 14, wherein the method uses semantic distances and multiscale clustering to simultaneously control the relevance and variety of results.

* * * * *